United States Patent [19]

Lee et al.

[11] Patent Number: 5,674,443
[45] Date of Patent: Oct. 7, 1997

[54] PROCESS FOR THE PREPARATION OF POLYESTER FILM

[75] Inventors: Kwang-Hyung Lee, Kyungki-do; Gwan-Hyung Lee, Incheon; Young-Jin Lee, Kyungki-do, all of Rep. of Korea

[73] Assignee: SKC Limited, Kyungki-do, Rep. of Korea

[21] Appl. No.: 533,219

[22] Filed: Sep. 25, 1995

[30] Foreign Application Priority Data

Sep. 26, 1994 [KR] Rep. of Korea ........ 94-24175
Sep. 26, 1994 [KR] Rep. of Korea ........ 94-24176

[51] Int. Cl.$^6$ ................................................ B29C 55/14
[52] U.S. Cl. ........................ 264/210.6; 264/210.7; 264/290.2; 524/425
[58] Field of Search ............... 264/210.6, 210.7, 264/290.2; 524/425, 430

[56] References Cited

U.S. PATENT DOCUMENTS

| | | | |
|---|---|---|---|
| 3,585,259 | 6/1971 | Lefferts et al. | 264/85 |
| 4,840,836 | 6/1989 | Eyraud | 428/213 |
| 4,871,784 | 10/1989 | Otonari et al. | 521/138 |
| 4,918,156 | 4/1990 | Rogers | 528/272 |
| 5,196,472 | 3/1993 | Kimura et al. | 524/425 |
| 5,268,135 | 12/1993 | Sasaki et al. | 264/210.7 |
| 5,316,714 | 5/1994 | Yoneda et al. | 264/210.6 |
| 5,376,711 | 12/1994 | Fujimoto et al. | 524/430 |
| 5,496,618 | 3/1996 | Kurihara et al. | 428/198 |

OTHER PUBLICATIONS

Newsletter of Kenrich Petrochemicals, Inc., vol. 3, No. 5, Aug. 1980.

*Primary Examiner*—Jeffery R. Thurlow
*Attorney, Agent, or Firm*—Anderson Kill & Olick P.C.

[57] ABSTRACT

A polyester film having improved surface and mechanical properties is prepared by transesterifying and polycondensing a dialkyl ester of an aromatic dicarboxylic acid and a glycol to give a polyester resin, and melt-extruding and drawing the polyester resin to give the polyester film, wherein calcium carbonate, surface treated with a titanate coupling agent by adding the titanate coupling agent to a glycol slurry containing 20 to 60 wt % of ball or rugby ball shaped vaterite type calcium carbonate having an average diameter ranging from 0.01 to 3 μm is incorporated during the preparation process of the polyester resin as a slip agent.

4 Claims, No Drawings

PROCESS FOR THE PREPARATION OF POLYESTER FILM

FIELD OF THE INVENTION

The present invention relates to a process for the preparation of a polyester film, and more particularly, to a process for the preparation of a polyester film having an improved surface and mechanical properties, by way of adding, as a slip agent, calcium carbonate which is surface treated with a coupling agent to improve its affinity to the polyester resin, thereby preventing coagulation of the slip agent on the film surface.

BACKGROUND OF THE INVENTION

In general, polyesters such as polyethylene terephthalate are known to possess good chemical stability, physical and mechanical strength, heat resistance, durability and chemical resistance; and, therefore, have been widely used in manufacturing various articles, including capacitors and magnetic recording media.

When polyester is shaped into a film for various applications, the preparation process and quality of the film as a product are generally influenced by the slipperiness and abrasion resistance of the film. These properties are particularly important where the polyester film is used as the base film of a magnetic recording tape, since it may be abraded during frictional contact with rollers for coating magnetic materials thereon.

To provide a polyester film with good slipperiness, runnabilty, processability and surface properties, several methods have been used. One method is to induce crystallization of the polymerization catalyst residues into inert particles. Another widely employed method is to add an inert particle such as calcium carbonate, kaolin or alumina during the preparation process of the polyester film. This inert particle, when incorporated into the polyester film, acts as a slip agent by forming minute protuberances on the surface of the film, thereby imparting improved runnability, processability and surface property to the film. However, this method may produce large coagulated particles of the slip agent and create voids on the surface of the film due to a low affinity of the particles to the polymer, thereby causing roughening of the film surface, deteriorated appearance of the film, occurrence of drop out in a magnetic tape therefrom, and lowered strength at insulation breakage of the film.

In order to overcome such undesirable properties of slip agents, many attempts have been made. Japanese Patent Laid-open Publication Nos. 92-151230 and 93-148372 suggest a method for improving surface properties of a polyethylene terephthalate film by using calcium carbonate as it is.

However, the polyester film produced in accordance with the above method suffers from the problems of a transition phenomenon of the slip agent, which occurs in a polar solvent by the action of hydroxide groups on the surface of the particles, and also from formation of voids in a highly extended film for magnetic recording media, thereby causing the separation of the particles and a decrease in strength at insulation breakage.

SUMMARY OF THE INVENTION

It is, therefore, an object of the present invention to provide a process for the preparation of a polyester film having improved surface and mechanical properties, by way of adding calcium carbonate treated with a coupling agent on its surface, which is a slip agent of improved affinity to the resin, thereby preventing coagulation of the slip agent on the film surface.

In accordance with the present invention, there is provided a process for the preparation of a polyester film which comprises transesterifying and polycondensing a dialkyl ester of an aromatic dicarboxylic acid and a glycol to give a polyester resin, and melt-extruding and drawing the polyester resin to give the polyester film, wherein calcium carbonate treated with a coupling agent on its surface is incorporated during the preparation process of the polyester resin as a slip agent.

DETAILED DESCRIPTION OF THE INVENTION

Representatives of the dialkyl esters of aromatic dicarboxylic acids include: dialkyl esters of terephthalic acid, isophthalic acid, naphthalene dicarboxylic acid, cyclohexane dicarboxylic acid, diphenoxyethane dicarboxylic acid, diphenyl dicarboxylic acid, diphenyl ether dicarboxylic acid, anthracene dicarboxylic acid and $\alpha,\beta$-bis(2-cholorophenoxy)ethane-4,4'-dicarboxylic acid. Among them, dimethyl terephthalate is most preferred.

Exemplary glycols include: ethylene glycol, trimethylene glycol, tetramethylene glycol, pentamethylene glycol, hexamethylene glycol and hexylene glycol. Among them, ethylene glycol is most preferred.

The polyester which may be preferably used in the present invention is polyethylene terephthalate obtained from dimethyl terephthalate and ethylene glycol by a conventional transesterification and polycondensation method well known in the art.

The surface treated calcium carbonate used as a slip agent in the present invention may be obtained by adding a coupling agent to a glycol slurry containing calcium carbonate. The calcium carbonate suitable for use in the present invention has an average particle diameter ranging from 0.005 to 5 µm, more preferably 0.01 to 3 µm, and is the ball or rugby ball-shaped vaterite type. The glycol slurry preferably contains calcium carbonate in an amount ranging from 20 to 60%, more preferably 25 to 55% by weight.

The coupling agent which may be preferably used in the present invention is a titanate compound, for example the compound of formula $(CH_3)_2CH_2-O-Ti-(ONHCH_2CH_3)_3$. The titanate compound may be added in an amount ranging from 0.01 to 2%, preferably 0.01 to 1.5% by weight based on the amount of the calcium carbonate employed.

The titanium coupling agent may be added to a stirred glycol slurry of calcium carbonate to treat the surface of the calcium carbonate, and the treatment temperature may range from 30° to 160° C., preferably from 30° to 120° C.

Further, an anionic surfactant may be added during the preparation of the glycol slurry in order to reduce the viscosity of the glycol slurry. The anionic surfactant which may be used in the present invention is sodium polyacrylate, sodium methacrylate, ammonium acrylate or a mixture thereof.

The resultant slurry is added as a slip agent during the preparation of the polyester, preferably during the transesterification step or immediately prior to the polycondensation step.

The polyester resin thus prepared is melt-extruded by the T-die method to give an amorphous sheet having a molecular weight of approximately 20,000, and the sheet is biaxially drawn to produce the polyester film of the present invention.

The drawing may be carried out by a conventional method at a temperature ranging from 60° to 150° C. in a draw ratio ranging from 2.5 to 6.0 in longitudinal and transverse directions.

The thickness of the polyester film prepared in accordance with the present invention may range from 2.0 to 200 μm depending on the use of the film.

The following Examples are intended to illustrate the present invention more specifically, without limiting the scope of the invention.

In Examples and Comparative Examples, the properties of the polymer film were evaluated in accordance with the following methods.

1. Average Particle Diameter

The average particle diameter was measured as a volumetric average diameter of an ethylene glycol slurry by employing a centrifugation type granulometer(SA-CP2, Shimadzu in Japan).

2. Viscosity

The viscosity was measured at a spindle speed of 60 rpm by employing B type viscometer(Brookfield in England) at room temperature.

3. Surface Smoothness

The surface smoothness of a 30 mm×20 mm×6 μm polyester film sample was determined by using a contact type surface roughness gauge(SURFCORDER SE-30D, Kosaka Institute in Japan).

Average Surface Roughness at Centerline($R_a$):

The height of a line parallel to a mean line of a roughness curve, when the areas of both sides of the line become equal.

Highest Height at Centerline($R_t$)

Distance from the highest point to the lowest point within the measuring area.

4. Mechanical Property

A 150 mm×15 mm×6 μm polyester film sample was drawn by using UTM(Instron, USA) at a speed of 200 m/min at the room temperature and relative humidity of 65%. The load-elongation curve was plotted and then each data point was calculated and evaluated.

elongation at breakage:

% of the elongated length at breakage to the original length of the film sample.

F-5 value:

stress value when the sample is elongated by 5% of the original length.

The mechanical property is evaluated as good when the elongation at breakage is low and the strength(F-5 value) is high.

5. Void Resistance

The film was photographed at 10,000 times, and void occurring around the slip agent was observed by employing a scanning electronic microscope(SEM) (JEOL Co. in Japan). The diameters of the void and the slip agent were measured and the void rate was calculated using the following formula:

$$\text{void rate} = \frac{(\text{diameter of the void}) - (\text{diameter of the slip agent})}{\text{diameter of the void}} \times 100$$

The void resistance was classified on the basis of the following criteria:

⊚: void rate of less than 1.1

○: void rate ranging from 1.1 to 1.4

Δ: void rate ranging from 1.4 to 1.7

X: void rate higher than 1.7

6. Abrasion Resistance

The abrasion resistance was determined by running a tape, which was made by slitting the film in a width of ½ inch, at a running speed of 3.3 cm/sec. twice by way of a tape running tester(TBT-300F, Yokohama System Institute in Japan), and observing the degree of the formation of white powder at the surface of the guide pin with a microscope.

The abrasion resistance was classified on the basis of the following criteria:

⊚: No white powder was formed on the surface of the guide pin.

○: White powders were formed on 20% of the surface of the guide pin.

Δ: White powders were formed on 50% of the surface of the guide pin.

X: White powders were formed on the entire surface of the guide pin.

7. Strength at Insulation Breakage

The strength at insulation breakage was evaluated as a value of voltage enduring per thickness of the film by employing a voltage tester(Tamadensoku in Japan) and classified on the basis of the following criteria:

⊚: more than 500 v/μm

○: 450–500 v/μm

Δ: 400–450 v/μm

X: less than 400 v/μm

Example 1-1

An ethylene glycol slurry containing 40 wt % of ball-shaped vaterite type calcium carbonate was prepared, and then the average particle size of calcium carbonate in the slurry was measured. The slurry was then heated to 50° C. and thereto was added $(CH_3)_2CH_2-O-Ti-(ONHCH_2CH_3)_3$ as a coupling agent, in an amount of 1.2 wt % based on the amount of calcium carbonate employed, to treat the surface of the calcium carbonate. The viscosity of the slurry thus obtained was measured.

Dimethyl terephthalate and ethylene glycol were mixed at a molar ratio of 1:2 and the resulting mixture was transesterified in the presence of zinc acetate as a transesterification catalyst, and thereto was added the ethylene glycol slurry obtained above in an amount of 0.17 wt % (based on the solid content), followed by a polycondensation step carried out at high temperature ranging from 250° to 285° C. in the presence of antimony trioxide as a polycondensation catalyst to obtain a polyester resin having a molecular weight of approximately 20,000.

The polyester resin thus obtained was dried and melt-extruded to form a cast sheet. The sheet was extended in a draw ratio of 3.5 in longitudinal and transverse directions at 90° C. to provide a biaxially oriented polyester film having the thickness of 6 μm. The properties of the film were measured and the results are shown in Table I.

Examples 1-2 to 1-4

The procedure of Example 1-1 was repeated except that the amount of the titanate coupling agent was varied within a range of 0.01 to 2 wt % as shown in Table I. When the titanate coupling agent was used in relatively excess amounts, sodium polyacrylate was additionally employed as a surfactant.

The results of the measurements are shown in Table I.

Comparative Examples 1-1 to 1-4

The procedures of Examples 1-1 to 1-4 were repeated except that calcium carbonate, which was not surface treated with coupling agent, was employed as a slip agent.

The results of the measurements are shown in Table I.

TABLE I

| | | Slip Agent | | | | Physical properties of film | | | | | |
|---|---|---|---|---|---|---|---|---|---|---|---|
| | | Additives | | Average Particle Diameter | Slurry | Surface Smoothness | | Mechanical Properties | | Strength at | | |
| | | (A) | (B) | | | | | | | | | |
| | | Amount* (wt %) | | $D_{50}$ (μm) | Viscosity** (cps) | $R_a$ (μm) | $R_t$ (μm) | F-5 value kg/mm | elongation (%) | Void Resistance | Insulation Breakage | Abrasion Resistance |
| Ex. | 1-1 | 1.2 | — | 0.2 | 52 | 0.017 | 0.230 | 10.190 | 142 | ⊙ | ⊙ | O |
| | 1-2 | 1.4 | 2.0 | 0.8 | 59 | 0.032 | 0.236 | 9.790 | 175 | ⊙ | ⊙ | ⊙ |
| | 1-3 | 1.0 | — | 0.7 | 48 | 0.030 | 0.222 | 9.533 | 156 | ⊙ | ⊙ | ⊙ |
| | 1-4 | 1.5 | 2.0 | 1.0 | 80 | 0.042 | 0.534 | 9.312 | 142 | ⊙ | O | O |
| Comp. Ex. | 1-1 | — | — | 0.2 | 250 | 0.024 | 0.299 | 8.330 | 175 | Δ | Δ | X |
| | 1-2 | — | — | 0.8 | 232 | 0.039 | 0.298 | 8.540 | 166 | X | O | Δ |
| | 1-3 | — | — | 0.7 | 230 | 0.038 | 0.302 | 7.435 | 178 | X | Δ | X |
| | 1-4 | — | — | 1.0 | 225 | 0.055 | 0.679 | 7.333 | 158 | X | O | X |

(A): Titanate Coupling Agent
(B): Anionic Surfactant: sodium polyacrylate
*: Based on the weight of calcium carbonate
**: The solid content of the slurry was 40 wt %.
$R_a$: Average surface roughness at centerline
$R_t$: Highest height at centerline Example 2-1 to 2-4 and Comparative Examples 2-1 to 2-4

The procedures of Examples 1-1 to 1-4 and Comparative Examples 1-1 to 1-4 were repeated except that calcium carbonate of rugby ball-shaped vaterite type was used instead of the ball-shaped vaterite type.

The results of measurements are shown in Table II.

TABLE II

| | | Slip Agent | | | | Physical properties of film | | | | | |
|---|---|---|---|---|---|---|---|---|---|---|---|
| | | Additives | | Average Particle Diameter | Slurry | Surface Smoothness | | Mechanical Properties | | Strength at | | |
| | | (A) | (B) | | | | | | | | | |
| | | Amount* (wt %) | | $D_{50}$ (μm) | Viscosity** (cps) | $R_a$ (μm) | $R_t$ (μm) | F-5 value kg/mm | elongation (%) | Void Resistance | Insulation Breakage | Abrasion Resistance |
| Ex. | 1-1 | 1.2 | — | 0.3 | 61 | 0.019 | 0.172 | 10.050 | 137 | ⊙ | ⊙ | ⊙ |
| | 1-2 | 1.4 | 2.0 | 0.5 | 70 | 0.028 | 0.185 | 9.998 | 154 | ⊙ | ⊙ | ⊙ |
| | 1-3 | 1.0 | — | 0.6 | 42 | 0.031 | 0.202 | 9.753 | 156 | ⊙ | ⊙ | ⊙ |
| | 1-4 | 1.5 | 2.0 | 0.9 | 75 | 0.035 | 0.306 | 9.451 | 168 | ⊙ | ⊙ | ⊙ |
| Comp. Ex. | 1-1 | — | — | 0.3 | 220 | 0.021 | 0.195 | 8.456 | 180 | Δ | Δ | X |
| | 1-2 | — | — | 0.5 | 205 | 0.030 | 0.206 | 8.421 | 172 | X | Δ | Δ |
| | 1-3 | — | — | 0.6 | 192 | 0.034 | 0.289 | 7.689 | 174 | Δ | Δ | X |
| | 1-4 | — | — | 0.9 | 190 | 0.042 | 0.75 | 7.242 | 180 | X | O | X |

(A): Titanate Coupling Agent
(B): Anionic Surfactant: sodium polyacrylate
*: Based on the weight of calcium carbonate
**: The solid content of the slurry was 40 wt %.
$R_a$: Average surface roughness at centerline
$R_t$: Highest height at centerline As can be seen from Tables I and II, the films prepared by employing a surface treated calcium carbonate as a slip agent in accordance with the present invention exhibit properties superior to those prepared by employing conventional un-treated calcium carbonate used in the prior art.

While the invention has been described with respect to the specific embodiments, it should be recognized that various modifications and changes may be made by those skilled in the art to the invention which also fall within the scope of the invention as defined by the appended claims.

What is claimed is:

1. A process for the preparation of a polyester film which comprises transesterifying and polycondensing a dialkyl ester of an aromatic dicarboxylic acid and a glycol to give a polyester resin, and melt-extruding and drawing the polyester resin to give the polyester film, wherein calcium carbonate, which is surface treated with a titanate coupling agent by adding the titanate coupling agent to a glycol slurry containing 20 to 60 wt % of ball or rugby ball shaped vaterite type calcium carbonate having an average diameter ranging from 0.01 to 3 μm, is incorporated during the preparation process of the polyester resin as a slip agent.

2. The process of claim 1, wherein the titanate coupling agent is the compound of formula $(CH_3)_2CH_2-O-Ti-(ONHCH_2CH_3)_3$.

3. The process of claim 2, wherein the titanate coupling agent is employed in an amount ranging from 0.01 to 2 wt % based on the amount of the calcium carbonate in the slurry.

4. The process of claim 1, wherein the glycol slurry further comprises an anionic surfactant selected from the group consisting of sodium polyacrylate, sodium methacrylate, ammonium acrylate and a mixture thereof.

* * * * *